J. HASKINS.

Wash-Boiler Attachments.

No. 6,136. Reissued Nov. 17, 1874.

Witnesses:
A. Gebner
Henry Finney

Inventor:
Joseph Haskins
By his attorneys
Cox and Cox

THE GRAPHIC CO. PHOTO-LITH. 39 & 41 PARK PLACE, N.Y.

UNITED STATES PATENT OFFICE.

JOSEPH HASKINS, OF ATCHISON, KANSAS.

IMPROVEMENT IN WASH-BOILER ATTACHMENTS.

Specification forming part of Letters Patent No. 149,858, dated April 21, 1874; reissue No. 6,136, dated November 17, 1874; application filed June 4, 1874.

*To all whom it may concern:*

Be it known that I, JOSEPH HASKINS, of Atchison, Kansas, have invented a Wash-Boiler Attachment, of which the following is a specification:

The invention relates to an improvement in attachments for wash-boilers; and consists of a pair of elongated perforated conical structures united on their inner edges, and at their outer edges and ends, to a vertical perforated rim, the latter feature fitting loosely in the imprint of the wash-boiler.

The object of the invention is to provide an efficient means for washing clothes, and analogous purpose, by utilizing ascending and descending currents of steam and water, the former under pressure, and, further, so to effect said object that the various currents shall not interfere with each other.

Figure 1:
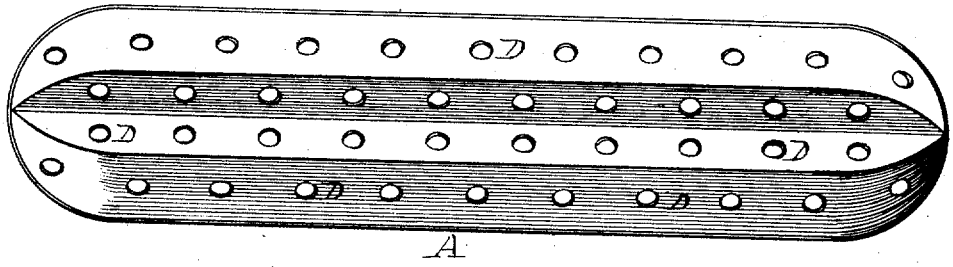
Figure 2:
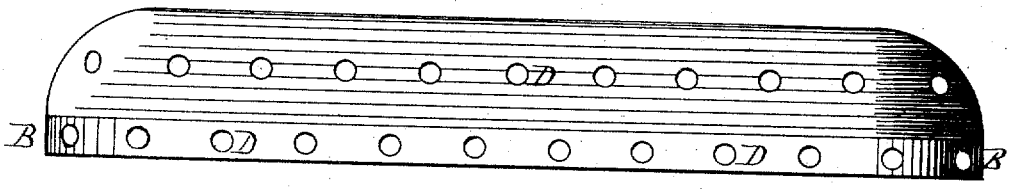
Figure 3:
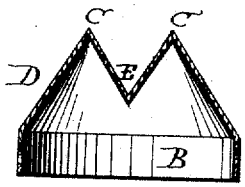

In the accompanying drawings, Figure 1 is a top view of a device embodying the elements of the invention. Fig. 2 is a side elevation of same, and Fig. 3 is a vertical central transverse section.

In the accompanying drawings, A is the attachment, which, preferably, is made of sheet metal, and so constructed that the rim B will fit loosely in the imprint of an ordinary wash-boiler. The rim is provided with perforations D through which the descending currents of material pass to the center of the device. To the upper edges of the rim B are secured the side and end edges of the double conoidal structure C, the sides of which are perforated, as shown, and form in their center an inverted apex, constituting a lateral channel through which the water can flow in either direction.

In operation the clothing lies upon and about the conoidal structure C, and the boiler being filled with water to the top of the structure C, the steam arises through the apertures in the part C, thence rises upward under pressure, passing through the clothing, and, becoming condensed against the side of the boiler, descends along the same, entering the apertures in the rim B, while a constant current of hot water flows laterally through the channel between the cones, entering the apertures in rim B. Thus none of the currents impinge or interfere, as the suction is toward the center of the device where the steam is generated. The number of cones may be increased as desired. The usual depth of the device is but a few inches.

I am aware that wash-boilers having false corrugated perforated bottoms are well known, also that devices having perforated rims are not novel, but none heretofore invented operate so as to create a lateral current of hot water; therefore

What I claim as my invention, and desire to secure by Letters Patent, is—

The perforated rim B, in combination with the double conoidal structure C, perforated, as shown, and having the lateral channel E for the purpose of utilizing, as specified, the currents of steam and water, substantially as set forth.

In testimony that I claim the foregoing improvement in wash-boiler attachments, as above described, I have hereunto set my hand this 26th day of May, A. D. 1874.

JOSEPH HASKINS.

Witnesses:

E. E. GORE,

D. MARTIN.